(12) United States Patent
Kim

(10) Patent No.: US 11,512,971 B2
(45) Date of Patent: Nov. 29, 2022

(54) APPARATUS FOR NAVIGATION SYSTEM WITH TRAFFIC ENVIRONMENT IN VEHICLE, SYSTEM HAVING THE SAME AND METHOD THEREOF

(71) Applicants: Hyundai Motor Company, Seoul (KR); Kia Motors Corporation, Seoul (KR)

(72) Inventor: Hyun Soo Kim, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 203 days.

(21) Appl. No.: 16/829,487

(22) Filed: Mar. 25, 2020

(65) Prior Publication Data

US 2021/0180974 A1 Jun. 17, 2021

(30) Foreign Application Priority Data

Dec. 13, 2019 (KR) .......... 10-2019-0166313

(51) Int. Cl.
| | |
|---|---|
| G01C 21/36 | (2006.01) |
| G08G 1/01 | (2006.01) |
| G08G 1/123 | (2006.01) |
| G01C 21/34 | (2006.01) |
| G06V 20/56 | (2022.01) |

(52) U.S. Cl.
CPC ..... *G01C 21/3617* (2013.01); *G01C 21/3469* (2013.01); *G06V 20/56* (2022.01); *G08G 1/0112* (2013.01); *G08G 1/0133* (2013.01); *G08G 1/0141* (2013.01); *G08G 1/123* (2013.01)

(58) Field of Classification Search
CPC .......... G01C 21/3617; G01C 21/3469; G06K 9/00791; G08G 1/0112; G08G 1/0133; G08G 1/0141; G08G 1/123; G06V 20/56
See application file for complete search history.

(56) References Cited

U.S. PATENT DOCUMENTS

| | | | | |
|---|---|---|---|---|
| 8,296,062 B2* | 10/2012 | Yamane | ........... | G08G 1/096866 701/428 |
| 9,799,222 B2* | 10/2017 | Bick | ........ | H04W 4/40 |
| 10,176,715 B2* | 1/2019 | Hansen | ........... | G08G 1/096844 |

(Continued)

FOREIGN PATENT DOCUMENTS

CN 107154165 A * 9/2017 ............ G08G 1/127

*Primary Examiner* — Luis A Martinez Borrero
(74) *Attorney, Agent, or Firm* — Slater Matsil, LLP

(57) ABSTRACT

A vehicle navigation apparatus is provided. The apparatus includes a vehicle sensor positioned in a front or a rear of a vehicle, the vehicle sensor configured to recognize surrounding information and road information of the vehicle, and a processor configured to identify destination information requested by a user of the vehicle, identify location information of the vehicle through the vehicle sensor, identify the recognized surrounding information and the recognized road information of the vehicle, and identify information about a route according to the identified destination information by controlling the vehicle to identify information about a bus station within a range specified based on the location information of the vehicle and bus information, calculating a degree of congestion of the route, and displaying the calculated degree of congestion through a display device.

20 Claims, 6 Drawing Sheets

(56) References Cited

U.S. PATENT DOCUMENTS

| | | | |
|---|---|---|---|
| 10,410,519 B2* | 9/2019 | Bick | H04W 4/029 |
| 10,705,522 B2* | 7/2020 | Choi | G01C 21/26 |
| 11,269,352 B2* | 3/2022 | Tao | G08G 1/0145 |
| 2007/0155404 A1* | 7/2007 | Yamane | G08G 1/09685 |
| | | | 455/456.1 |
| 2012/0041675 A1* | 2/2012 | Juliver | G06Q 10/08 |
| | | | 701/465 |
| 2015/0228193 A1* | 8/2015 | Bick | H04W 4/029 |
| | | | 340/990 |
| 2015/0286936 A1* | 10/2015 | Furuya | G06N 5/04 |
| | | | 706/58 |
| 2016/0290818 A1* | 10/2016 | Kim | G01C 21/3423 |
| 2016/0291852 A1* | 10/2016 | Kim | G01C 21/367 |
| 2017/0293950 A1* | 10/2017 | Rathod | G06Q 30/0283 |
| 2018/0033300 A1* | 2/2018 | Hansen | G08G 1/096791 |
| 2018/0040245 A1* | 2/2018 | Bick | G06Q 10/025 |
| 2018/0376305 A1* | 12/2018 | Ramalho de Oliveira | |
| | | | H04W 4/44 |
| 2019/0049253 A1* | 2/2019 | Kitamura | G08G 1/01 |
| 2019/0094855 A1* | 3/2019 | Choi | G05D 1/0276 |
| 2019/0122541 A1* | 4/2019 | Fowe | G08G 1/0133 |
| 2019/0174276 A1* | 6/2019 | Mineiro Ramos de Azevedo | |
| | | | H04W 4/38 |
| 2019/0187723 A1* | 6/2019 | Tao | G01C 21/3415 |
| 2019/0205115 A1* | 7/2019 | Gomes | H04W 4/50 |
| 2019/0206009 A1* | 7/2019 | Gibson | G06Q 10/06315 |
| 2019/0228358 A1* | 7/2019 | Ootsuka | G06Q 10/06312 |
| 2019/0311616 A1* | 10/2019 | Jin | G05D 1/0297 |
| 2020/0020227 A1* | 1/2020 | Ran | G08G 1/075 |
| 2020/0098263 A1* | 3/2020 | Yi | G08G 1/005 |
| 2021/0011920 A1* | 1/2021 | Sudarsan | G06N 3/086 |
| 2021/0192420 A1* | 6/2021 | Spielman | G06N 20/00 |
| 2021/0223051 A1* | 7/2021 | Hochberg | G06Q 10/0631 |

* cited by examiner

APPARATUS FOR NAVIGATION SYSTEM WITH TRAFFIC ENVIRONMENT IN VEHICLE, SYSTEM HAVING THE SAME AND METHOD THEREOF

CROSS-REFERENCE TO RELATED APPLICATIONS

This application claims priority to Korean Patent Application No. 10-2019-0166313, filed in the Korean Intellectual Property Office on Dec. 13, 2019, which application is hereby incorporated herein by reference.

TECHNICAL FIELD

The present disclosure relates to a vehicle navigation apparatus and a method thereof.

BACKGROUND

Domestically, bus lanes and stops are present in the rightmost end lane. Some overseas countries also operate bus-only lanes and bus stops in the same manner. For this reason, when a vehicle driver receives a guide of a right turn while driving on a city road, the driver may wait in the right lane for a long time because of a bus stopping at a bus station, a bus entering a station, or a bus moving from a station to another lane.

In this case, the guidance reliability for the driver may be reduced in addition to causing an increase in the predicted time of arrival for the desired destination.

For the purpose of improving the guidance reliability for a user and the predicted accuracy of the arrival time, there is a need for an additional service method in a vehicle.

SUMMARY

Embodiments of the present disclosure can solve above-mentioned problems occurring in the prior art while advantages achieved by the prior art are maintained intact.

An embodiment of the present disclosure provides a vehicle navigation apparatus and a method thereof. Particular embodiments provide a method of providing additional information and an optimized route using intra-city bus traffic information.

Another embodiment of the present disclosure provides a vehicle navigation apparatus that provides a vehicle route in consideration of road information and the surrounding environment of a moving vehicle, and a method thereof.

Another embodiment of the present disclosure provides a vehicle navigation apparatus that provides a vehicle route by calculating the degree of congestion of a road based on the predetermined range of a moving vehicle, and a method thereof.

Another embodiment of the present disclosure provides a vehicle navigation apparatus that provides a vehicle route in consideration of information of bus stations and bus routes based on the predetermined range of a moving vehicle, and a method thereof.

Another embodiment of the present disclosure provides a vehicle navigation apparatus that provides a vehicle route again in consideration of the predicted degree of congestion based on the predetermined range of a moving vehicle, and a method thereof.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a vehicle navigation apparatus may include a vehicle sensor positioned in the front and/or rear of a vehicle for recognizing surrounding information and road information of the vehicle and a processor for identifying destination information requested by a user of the vehicle, identifying location information of the vehicle through the vehicle sensor, and identifying the recognized surrounding information and the recognized road information of the vehicle and information about a route according to the identified destination information. In identifying the route information, the processor may control the vehicle to identify information about a bus station within a range specified based on the location information of the vehicle and bus information, to calculate a degree of congestion of the route, and to display the calculated degree of congestion through a display device.

In an embodiment, the processor may identify a degree of congestion for a bus station, a degree of congestion of a bus, and weighting information about a bus route within the range specified based on the location information of the vehicle to calculate a degree of congestion.

In an embodiment, the processor may be configured to set a specific range of a vehicle radius based on the location information of the vehicle to calculate the degree of congestion. The vehicle radius may be set to a different value depending on needs of a user or settings of a system for a vehicle navigation service.

In an embodiment, the processor may be configured to calculate a degree of congestion, using the equation $f(x) = c_0 + \Sigma_{n=1}^{N} a_n b_n$. 'N' may include the total number of stations, 'a' may include a degree of congestion for a bus station, 'b' may include a degree of congestion of a bus, and 'c' may include a weighting parameter indicating a route of a bus departing from a station immediately before an intersection.

In an embodiment, the processor may discriminately apply a weight to the degree 'a' of congestion to be classified into 3 stages, may discriminately apply a weight to the degree 'b' of congestion of the bus to be classified into 3 stages, may apply the case that a route of a bus is a left-turn or U-turn to be classified as 'x', may apply the case that a route of a bus is straight to be classified as 'y', and may apply the case that a route of a bus is a right-turn to be classified as 'z'. Herein, the degree 'a' of congestion for the bus station is defined as a density of waiting people relative to an area for the bus station.

In an embodiment, the processor may control the vehicle to compare the calculated degree of congestion with a route range predetermined for a vehicle navigation service and to provide a route corresponding to a corresponding range depending on the compared result.

In an embodiment, the processor may determine whether the calculated degree of congestion belongs to a first route range indicating road congestion and a vehicle waiting route, may determine whether the calculated degree of congestion belongs to a second route range indicating a lane change and entrance of a right-turn, or may determine whether the calculated degree of congestion belongs to a third route range indicating a detour route.

In an embodiment, the processor may control the vehicle to reset a degree of congestion depending on a movement and route information of the vehicle and to update a route depending on the reset degree of congestion.

In an embodiment, the vehicle sensor may include at least one of a Global Positioning System (GPS), a GPS sensor, a gyro sensor, and/or an acceleration sensor.

In an embodiment, the display device may display a guide comment for the degree of congestion via a screen or perform an alarm through a sound, through at least one of Audio Video Navigation (AVN) and/or an alarm device.

According to an embodiment of the present disclosure, a vehicle navigation method may include recognizing surrounding information and road information of a vehicle and identifying destination information requested by a user of the vehicle, identifying location information of the vehicle through a sensor of the vehicle, and identifying the recognized surrounding information and the recognized road information of the vehicle and information about a route according to the identified destination information. In identifying the route information, the identifying may include controlling the vehicle to identify information about a bus station within a range specified based on the location information of the vehicle and bus information, to calculate a degree of congestion of the route, and to display the calculated degree of congestion through a display device.

In an embodiment, the controlling may include identifying a degree of congestion for a bus station, a degree of congestion of a bus, and weighting information about a bus route within the range specified based on the location information of the vehicle to calculate a degree of congestion.

In an embodiment, the controlling may include setting a specific range of a vehicle radius based on the location information of the vehicle to calculate the degree of congestion. The vehicle radius is set to a different value depending on needs of a user or settings of a system for a vehicle navigation service.

In an embodiment, the controlling may include calculating a degree of congestion, using the following equation $f(x)=c_0+\sum_{n-1}^{N}a_n b_n$. 'N' may include the total number of stations, 'a' may include a degree of congestion for a bus station, 'b' may include a degree of congestion of a bus, and 'c' may include a weighting parameter indicating a route of a bus departing from a station immediately before an intersection.

In an embodiment, the controlling may include discriminately applying a weight to the degree 'a' of congestion to be classified into 3 stages, discriminately applying a weight to the degree 'b' of congestion of the bus to be classified into 3 stages, applying the case that a route of a bus is a left-turn or U-turn to be classified as 'x', applying the case that a route of a bus is straight to be classified as 'y', and applying the case that a route of a bus is a right-turn to be classified as 'z'. Herein, the degree 'a' of congestion for the bus station is defined as a density of waiting people relative to an area for the bus station.

In an embodiment, the controlling may include controlling the vehicle to compare the calculated degree of congestion with a route range predetermined for a vehicle navigation service and to provide a route corresponding to a corresponding range depending on the compared result.

In an embodiment, the controlling may include determining whether the calculated degree of congestion belongs to a first route range indicating road congestion and a vehicle waiting route, determining whether the calculated degree of congestion belongs to a second route range indicating a lane change and entrance of a right-turn, or determining whether the calculated degree of congestion belongs to a third route range indicating a detour route.

In an embodiment, the controlling may include controlling the vehicle to reset a degree of congestion depending on a movement and route information of the vehicle and to update a route depending on the reset degree of congestion.

In an embodiment, the identifying may include identifying the location information of the vehicle through a vehicle sensor of at least one of a Global Positioning System (GPS), a GPS sensor, a gyro sensor, and/or an acceleration sensor.

In an embodiment, the controlling may include controlling the vehicle to display a route comment for the degree of congestion via a screen or to perform an alarm through a sound through a display device of at least one of Audio Video Navigation (AVN) and/or an alarm device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
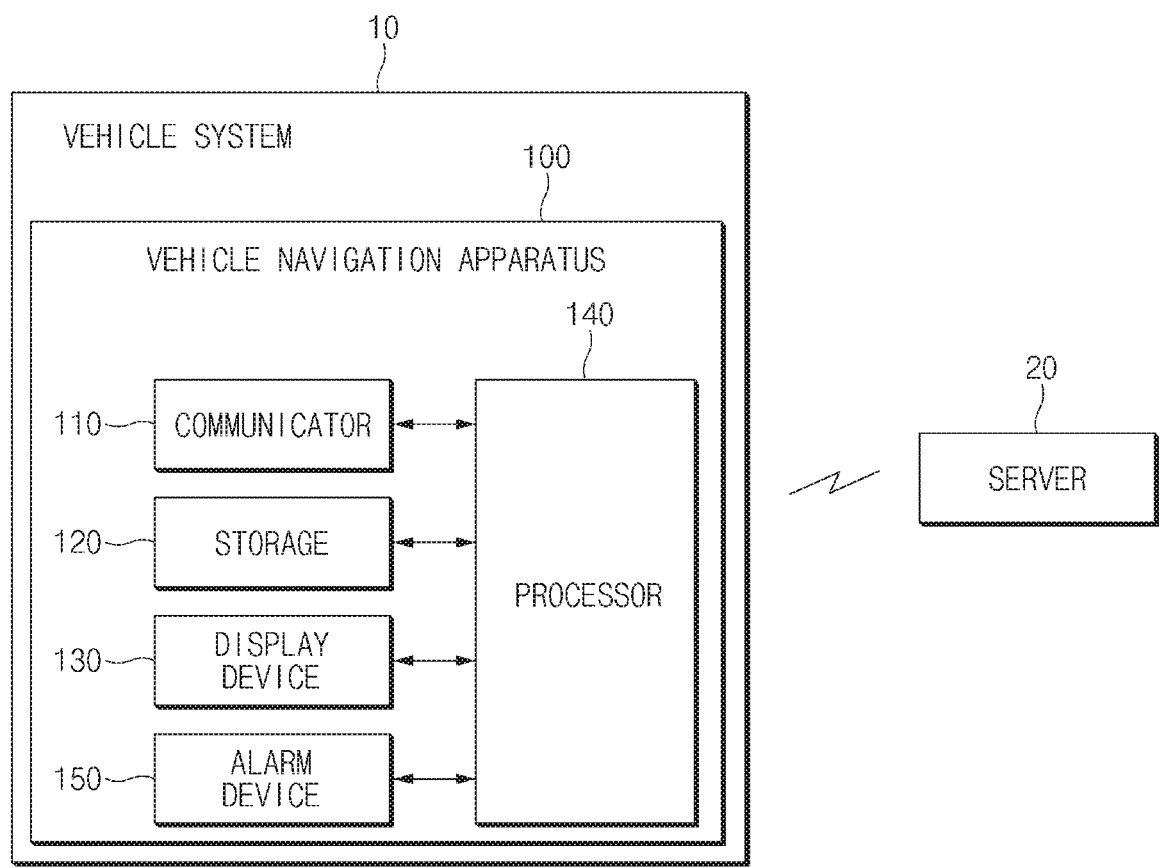
FIG. 1 is a block diagram illustrating a configuration of a vehicle system including a vehicle navigation apparatus, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be omitted in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Below, various embodiments of the present disclosure will be described in detail with reference to FIGS. 1 to 6.

FIG. 1 is a block diagram illustrating a configuration of a vehicle system including a vehicle navigation apparatus, according to an embodiment of the present disclosure.

Referring to FIG. 1, a vehicle navigation apparatus 100 according to an embodiment of the present disclosure may include a communicator no, storage 120, a display device 130, a processor 140, and an alarm device 150.

The communicator no may be a hardware device implemented with various electronic circuits for transmitting and receiving signals over a wireless or wired connection, In the present embodiment, the communicator no may perform communication in the vehicle through controller area network (CAN) communication, CAN with flexible data-rate (CAN-FD) communication, local interconnect network (LIN) communication, Ethernet communication, and the like. The communicator no may include various communication units such as a mobile communication unit for communication with a server 20 and an external diagnosis device, which are placed outside a vehicle, a broadcast receiving unit such as a DMB module or a DVB-H module, a short range communication unit such as a ZigBee module being a Bluetooth module or an NEC module, a Wi-Fi communication, and the like. In particular, according to an embodiment of the present disclosure, the communicator no may receive location information and road situation information for a vehicle navigation service, using a 4G and/or 5G communication system and a GPS satellite system as a backhaul. For example, a vehicle connected to a network through an LTE system (5G system) transmits and receives wireless data to a user in a vehicle through a navigation system, a user terminal, or communication devices.

The storage 120 may store the data downloaded for the vehicle wireless update, which is received from the server 20, via the communicator no. Accordingly, the storage 120 may temporarily store information about a road environment and road surrounding information such as location information of the host vehicle, road information, and bus station information, which are collected through vehicle sensors provided in the vehicle. Furthermore, the storage 120 may store destination information set by the user, previously found route information, and the like. According to an embodiment of the present disclosure, the external server may be a telematics center for a vehicle navigation service. Alternatively, the external server may be a server supporting data of various input sensors for supporting autonomous driving, road information, and communication information. In addition, the storage 120 may store at least one or more of a network load, a vehicle power state, a battery state, and/or the predicted time required to transmit remaining ROM data, which are determined by the processor 140.

The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and/or an optical disc type of a memory.

The display device 130 may be controlled by the processor 140 to display a screen for receiving the approval of user authentication for the wireless update of a vehicle. The display device 130 may be implemented with a head-up display (HUD), a cluster, or an audio video navigation (AVN). Furthermore, the display device 130 may include at least one of a Liquid Crystal Display (LCD), a Thin Film Transistor-LCD (TFT LCD), a Light Emitting Diode (LED) display, an Organic LED (OLED) display, an Active Matrix OLED (AMOLED) display, a flexible display, a bended display, and/or a 3D display. Some of the displays may be implemented with a transparent display that is transparent or translucent to view the outside. Moreover, the display device 130 may be provided as a touchscreen including a touch panel and may be used as an input device in addition to an output device.

The processor 140 may be electrically connected to the communication device no, the storage 120, the display device 130, the alarm device 150, and the like, may electrically control each of the components, may be an electrical circuit that executes the instructions of the software, and may perform various data processing and calculations described below. In particular, according to an embodiment of the present disclosure, the processor 140 allows vehicle sensors positioned in the front and rear of a vehicle to recognize vehicle information located at the front and rear of the vehicle to recognize surrounding information for predicting things around a vehicle/road conditions and the degree of congestion. The processor 140 also identifies the route degree of congestion of a vehicle predicted through a vehicle sensor and an external server and controls the device for the vehicle navigation service. That is, the processor 140 may allow the navigation device and the user communication device, which are provided in a vehicle, to display the route and an alarm for the degree of congestion provided through the server. Moreover, the processor 140 may determine whether a user of the vehicle is a user accessed through a vehicle navigation app, may transmit information about the identified user to a telematics center, and may allow the authenticated user to receive the differentiated vehicle navigation through the telematics center.

When displaying a screen for receiving approval from the user on the display device 13o, the alarm device 150 may output a notification for approval to the user. Alternatively, the alarm device 150 may provide various pieces of information for vehicle navigation, such as resetting the route for the degree of congestion and the alarm regarding the degree of congestion.

Figure 2:
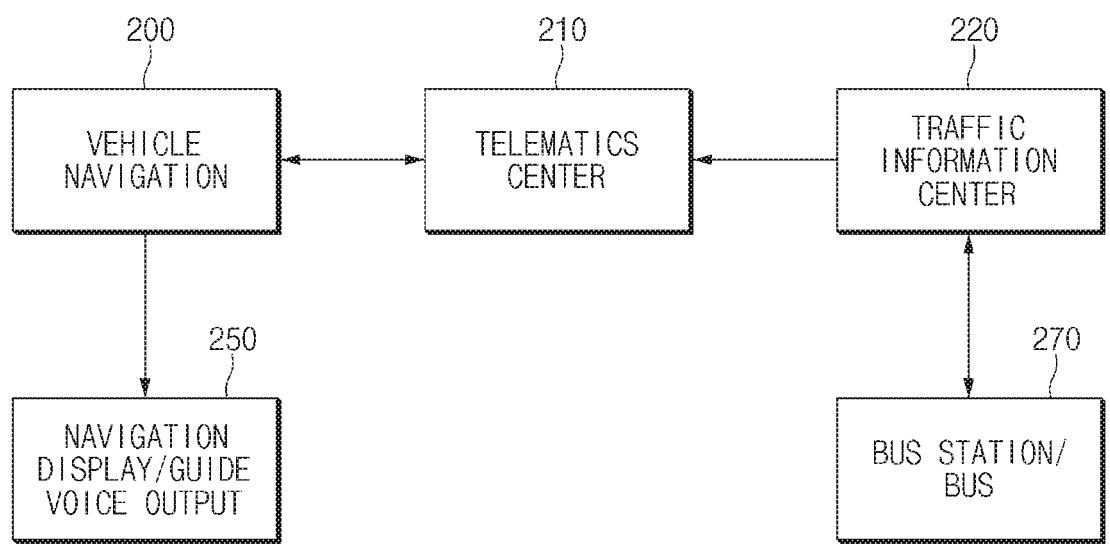
FIG. 2 is a block diagram briefly illustrating a vehicle navigation system according to an embodiment of the present disclosure.

FIG. 2 is a block diagram briefly illustrating a vehicle navigation system according to an embodiment of the present disclosure.

Referring to FIG. 2, vehicle navigation 200 transmits information about the location of the host vehicle, surrounding information, and road environment, which may be detected through a GPS sensor, a gyro sensor, and an acceleration sensor, to the telematics center 210. Furthermore, when a destination is set by a vehicle driver, the vehicle navigation 200 delivers the corresponding destination information to the telematics center 210.

The navigation system to which the present disclosure is applied is equipped with a GPS sensor to receive a signal received from a GPS satellite and to calculate the location of a target. When the signal of the GPS sensor may not be properly received in a tunnel, an indoor parking lot, a building forest, or the like, the gyro sensor supplements location information about the GPS sensor, using dead reckoning navigation called dead reckoning (DR). The DR scheme is a location tracking technology that tracks a current location by calculating the travel distance and direction from the starting point of the location to the current location. In the DR scheme, the accurate navigation system is implemented by guessing the location of the host vehicle based on the angle information obtained from the angular velocity detected by the gyro sensor and the distance information by the speed signal. The gyro sensor is a sensor providing a rotational angular velocity and uses an angular velocity value for the x, y, and z axes. The acceleration sensor is a sensor providing the current acceleration of a vehicle and is used to calculate the moving distance. As described, the vehicle navigation performs location information of the host vehicle, road search, and the like, using a GPS sensor and vehicle sensors provided in the host vehicle. In this way, the vehicle navigation efficiently provides destination information to a vehicle driver through public transport search, map search, or the like.

The telematics center 210 searches for the route to the destination set by a driver to deliver the route to the vehicle navigation 200. For the purpose of maintaining/managing a vehicle safely and conveniently using location information and a wireless communication network, the telematics center may provide passengers with a safety convenience service such as route guidance, the provision of traffic information, and emergency rescue information, as well as an infotainment service such as Internet, a movie, a game, or the like. That is, users may identify and respond to various road traffic information including traffic conditions through a remote information service capable of transmitting and receiving various pieces of information in real time through mobile communication, Internet, or a navigation system based on a vehicle and may also receive vehicle safety, security, diagnostics, communication, and navigation information as well as the personalized information service for the users.

In an embodiment, when a right-turn link is included in the route received from the telematics center 210, the vehicle navigation 200 makes a request for information about bus stations and buses, which are in the corresponding lane from 1 km before the right turn.

In an embodiment, a bus station 270 classifies the degree of congestion depending on the number of people within a bus station, using a sensor (an infrared sensor, or the like). The degree of congestion may be defined as smooth/normal/congested. When identifying that a person enters a bus station, through a human body sensor, the sensor provided in the bus station identifies the number of people in the specified area through a sensor installed on a wall and a top end. The bus 270 classifies the degree of congestion depending on the number of people in the bus using a sensor (an infrared sensor, or the like) and transportation card information. The degree of congestion may be defined as smooth/normal/congested.

The telematics center 210 receives information about bus stations and buses from the traffic information center 220 to calculate the degree of congestion of the right-turn lane. When the calculation is complete, the telematics center 210 transmits the corresponding information to the vehicle navigation 200, which provides it to the navigation display 250. The navigation display 250 displays additional information through a display and outputs the additional information to the speaker through sound guidance. Herein, the traffic information center 220 is in charge of collecting and delivering various pieces of traffic information, comprehensive analysis of traffic conditions, and traffic management and manages roads and traffic by observing road traffic flows and sudden situations such as accidents, congestion, construction, demonstrations, and the like. The traffic information may be collected through CCTV video, a real-time signal control system, a detector, a vehicle location tracking device (GPS), a traffic reporter, traffic police, a general telephone report, or the like; the collected traffic information may be analyzed/processed through advanced automated processing systems and may be provided in real time through Internet, TV, a radio station, a phone, a navigation service app, and the like.

In the meantime, when it is determined that the degree of congestion of the right-turn lane is higher than the set reference value, the telematics center 210 resets the route to deliver the reset route to the vehicle navigation 200, and the vehicle navigation 200 provides directions to the reset route to the driver. The reset route is provided to the user through the display device and/or a speaker of the navigation display 250.

Figure 3:
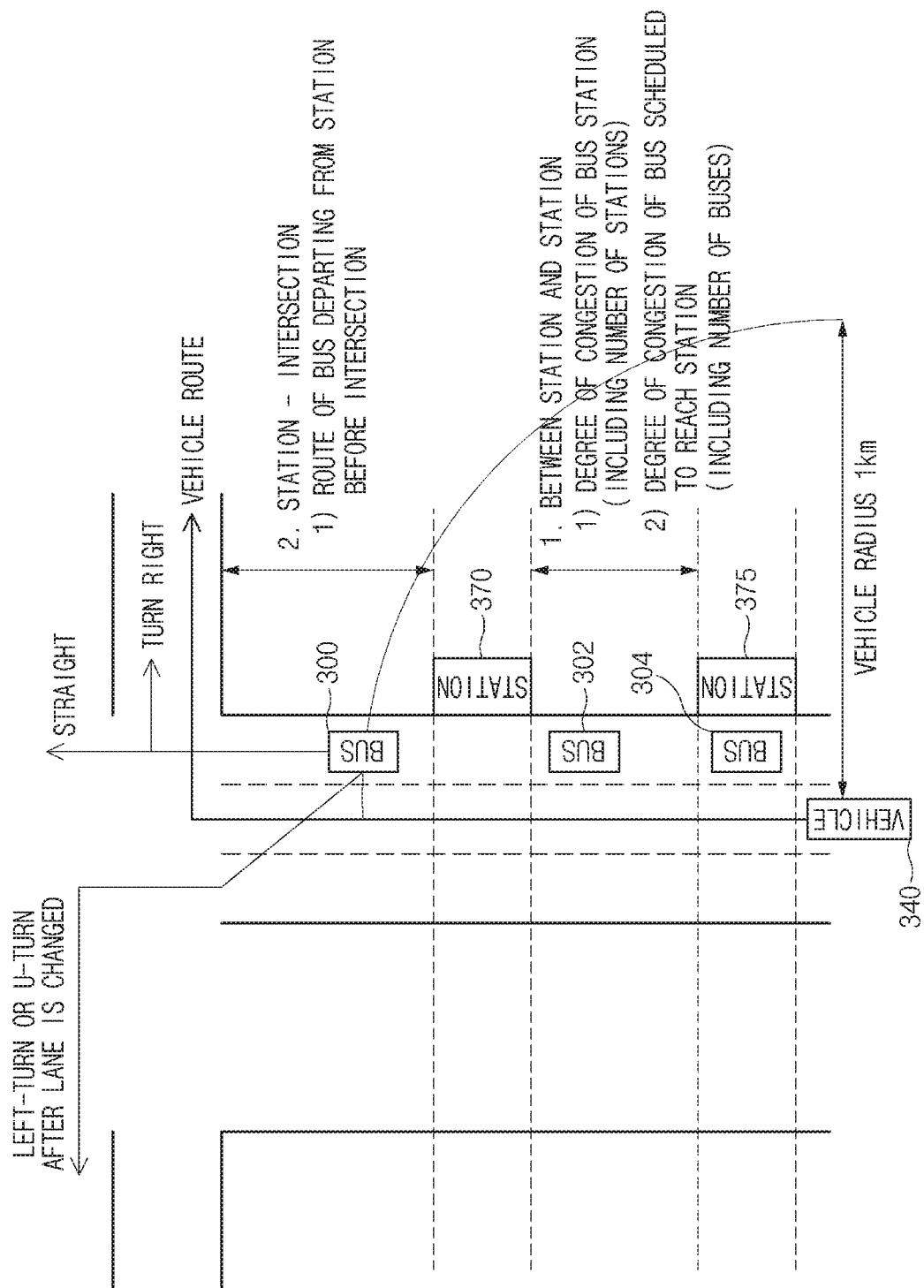
FIG. 3 is a view schematically illustrating components for a vehicle navigation service, according to an embodiment of the present disclosure.

FIG. 3 is a view schematically illustrating components for a vehicle navigation service, according to an embodiment of the present disclosure.

Referring to FIG. 3, a vehicle 340 receives the degree of congestion of a right-turn lane through a telematics center, to which bus information and road information are reflected.

In more detail, the telematics center receives, from the traffic information center, information about the degree of congestion of a right-turn calculated in consideration of the complexity according to the bus route and the interval between buses of each bus 300, 302, and 304, the distance between corresponding bus stations 370 and 375, the degree of congestion at each station, the route of the corresponding bus, and the predicted arrival of each bus. When detecting that a moving vehicle enters the specified range of the corresponding route, through the navigation in a vehicle, the telematics center guides the degree of congestion of the right-turn calculated based on the received information, through the navigation.

For example, the telematics center identifies the corresponding route through GPS, a gyro sensor, and an acceleration sensor of a vehicle navigation system, calculates the degree of congestion by identifying the station information and bus route information within the specified range of the corresponding route, and guides the calculated degree of congestion to the vehicle navigation. The degree of congestion of the right-turn is calculated in consideration of the number of stations within a specific range (e.g., 1 km) specified based on the vehicle, for example, a vehicle radius, the interval between stations, the degree of congestion of the corresponding station, the degree of congestion (including the number of buses) of a bus scheduled to reach a station, traffic information between a station and an intersection, a route of a bus departing from the station before the intersection, or the like. Herein, the range of the vehicle radius may be set to a different value depending on the performance of the navigation. Alternatively, the range of the vehicle radius may be determined as a different range depending on the need of a user and may be reflected.

The calculation of the degree of congestion according to an embodiment of the present disclosure may be used as shown in Equation 1 below.

$$f(x) = c_0 + \sum_{n=1}^{N} a_n b_n \qquad \text{[Equation 1]}$$

Herein, 'N' denotes the total number of stations; 'a' denotes the degree of congestion for a bus station; 'b' denotes the degree of congestion of a bus; 'c' denotes a weighting parameter indicating a route of a bus departing from a station immediately before an intersection.

'a' may be set to a value among 0.6, 0.3, or 0.1.

The weights for calculating the degree of congestion for a bus station are classified into three categories: congested=0.6, normal=0.3, or smooth=0.1.

Accordingly, 'a' is set to one of three values.

'b' may be defined as "0.6x+0.3y+0.1z"

The weights for calculating the degree of congestion for a bus are classified into three categories: congested=0.6, normal=0.3, or smooth=0.1.

The case that a bus scheduled to reach a station is crowded is classified as 'x'; the case that a bus scheduled to reach a station is normal is classified as 'y'; the case that a bus scheduled to reach a station is smooth is classified as 'z'.

Accordingly, the degree of congestion of all buses arriving at a single station is calculated as 'b'.

'$C_o$' may be defined as "0.4x+0.2y+0.2z".

The case that a route of a bus departing from a station immediately before a right-turn at an intersection is a left-turn or U-turn is classified as 'x'; the case that a route of a bus departing from a station immediately before a right-turn at an intersection is straight is classified as 'y'; the case that a route of a bus departing from a station immediately before a right-turn at an intersection is a right-turn is classified as 'z'.

'x', 'y', or 'z' is the number of buses having each route.

The route setting for the vehicle navigation service may be defined based on f(x) according to an embodiment of the present disclosure as follows.

When f(x) is not less than 1 and is less than 5, a congestion route is provided. This may include 'temporarily waiting for a vehicle'.

When f(x) is not less than 6 and is less than 10, 'change lane to enter a right-turn' is provided.

When f(x) is not less than 10, 'detour route' is provided.

The above-described disclosure is a turning point in the case of a reference; and it may be necessary to calculate the degree of congestion and to apply route settings again, depending on further analysis.

Hereinafter, it will be described that the degree of congestion of a bus station according to an embodiment of the present disclosure is calculated. The degree of congestion at a bus station may be defined as a density of the waiting people relative to an area.

1) Identify the number of people in the waiting space of a bus station, using a sensor (an infrared sensor, or the like) in the bus station.

2) The number of people capable of being accommodated in a bus station: the area of the waiting space in a bus station/occupied area per person 0.4 m².

3) Determination criterion: density (%)=the number of waiting people/the number of people capable of being accommodated ×100. The determination criterion may be defined as follows.

Smooth: the case that a density is less than 33%.

Normal: the case that a density is not less than 33% and is less than 66%.

Congested: the case that a density is greater than 66%.

Hereinafter, it will be described that the degree of congestion of a bus according to an embodiment of the present disclosure is calculated. For this purpose, the degree of congestion of a bus may be defined in consideration of the number of seats, the number of handles, or the like.

1) Identify the number of people in a bus, using a sensor (an infrared sensor, or the like) and a transportation card reader in the bus.

Transportation card reader: the number of passengers that get on and off a bus may be identified using a card.

2) The number of people capable of being accommodated in a bus: the total number of seats in a bus+ the number of handles (a single passenger per handle in a bus).

3) Determination criterion.

Smooth: the case that the number of passengers in a bus is not greater than the number of seats.

Normal: the case that the number of passengers in the case of "normal" is greater than the number of passengers in the case of "smooth" and the number of passengers in a bus is not greater than the sum of the number of seats and the number of handles.

Congested: the case that the number of passengers in a bus is greater than the sum of the number of seats and the number of handles.

According to an embodiment of the present disclosure, more accurate road prediction may be implemented in the route of a vehicle, by reflecting the calculation of the degree of congestion of a bus station and the degree of congestion of a bus using a parameter for calculating the degree of congestion.

Figure 4:
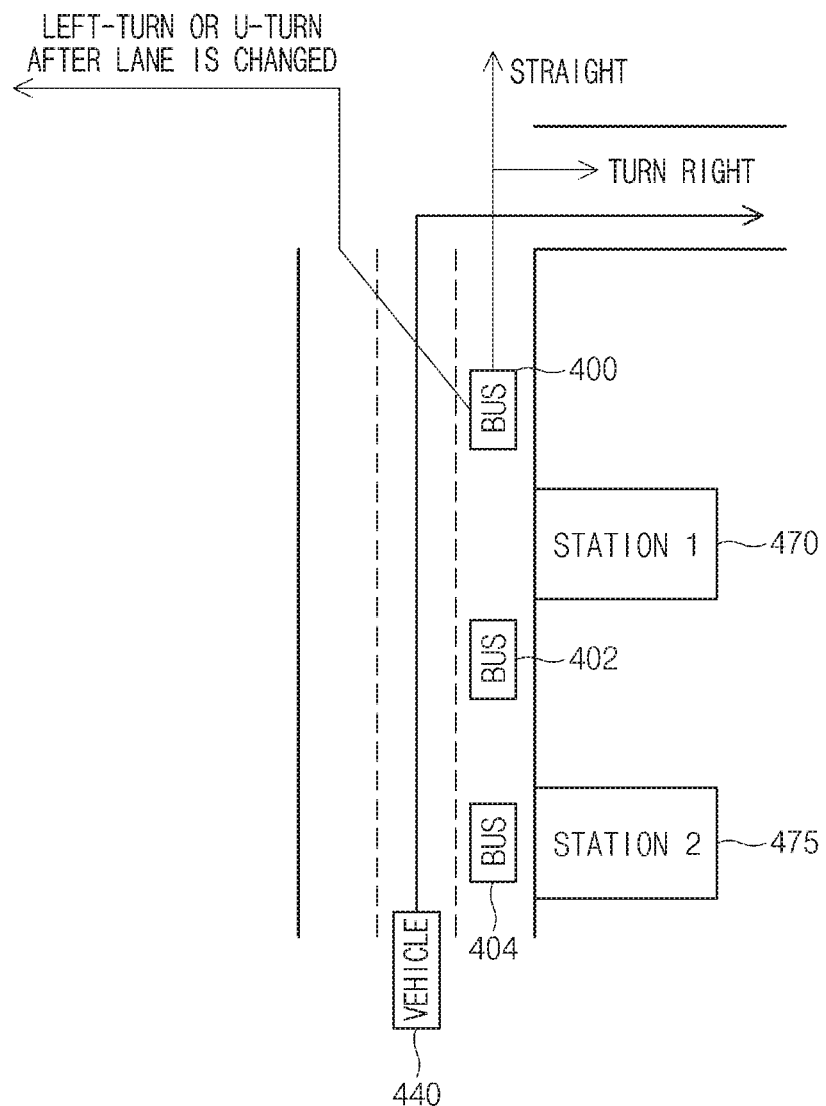
FIG. 4 is a diagram schematically illustrating a procedure of performing lane guidance in consideration of the degree of congestion of a city bus, according to another embodiment of the present disclosure.

FIG. 4 is a diagram schematically illustrating a procedure of performing lane guidance in consideration of the degree of congestion of a city bus, according to another embodiment of the present disclosure.

Referring to FIG. 4, the process of identifying the route of a vehicle and performing route prediction by reflecting the information about a station within the range determined based on the vehicle and information about the movement to the corresponding station/a bus predicted to move is described.

For example, two stations 470 and 475 are detected by a vehicle 440. Moreover, there are buses 400, 402 and 404 with respect to the stations 470 and 475. In this case, the degree of congestion of a right-turn lane may be calculated as follows.

1. The total number 'N' of stations is 2.

Station 1: congested and station 2: normal

2. The number of buses scheduled to arrive at station 1 is 4 and the number of buses scheduled to arrive at station 2 is 3.

The degree of congestion of a bus scheduled to arrive at station 1: two buses are crowded and two buses are normal.

The degree of congestion of a bus scheduled to arrive at station 2: a single bus is crowded and two buses are normal.

3. Route information of four buses scheduled to depart from station 1.

The number of buses that turn to the left is one; the number of buses that go straight is two; the number of buses that turn to the right is one.

Accordingly, each station, the bus scheduled to arrive at each station, and the degree of congestion through each station and the bus scheduled to arrive at each station may be calculated by applying the identified values as follows.

Station: a1=0.6 (congested), a2=0.3 (normal).

Bus scheduled to arrive at station 'a1': (0.6×2+0.3×2)=1.8.

Bus scheduled to arrive at station 'a2': (0.6×1+0.3×2)=1.2.

The route weight of a bus departing from a station immediately before a right-turn at an intersection: (0.4×1+0.2×2+0.2×1)=1.0.

Accordingly, the final calculation is calculated as 2.44 as follows.

Sum=0.6 (0.6×2+0.3×2)+0.3 (0.6×1+0.3×2)+(0.4×1+0.2×2+0.2×1)=2.44.

As the calculated total cost value is 2.44, this corresponds to a 'range of 1 or more and less than 5 for vehicle routing.

The information about the congestion routing is delivered to the navigation, and the navigation visually displays the information about the congestion routing and acoustically outputs the information about the congestion routing to the speaker. For example, "the right-side lane is busy due to a bus, and please note upon turning to the right", or the like may be output.

Figure 5:
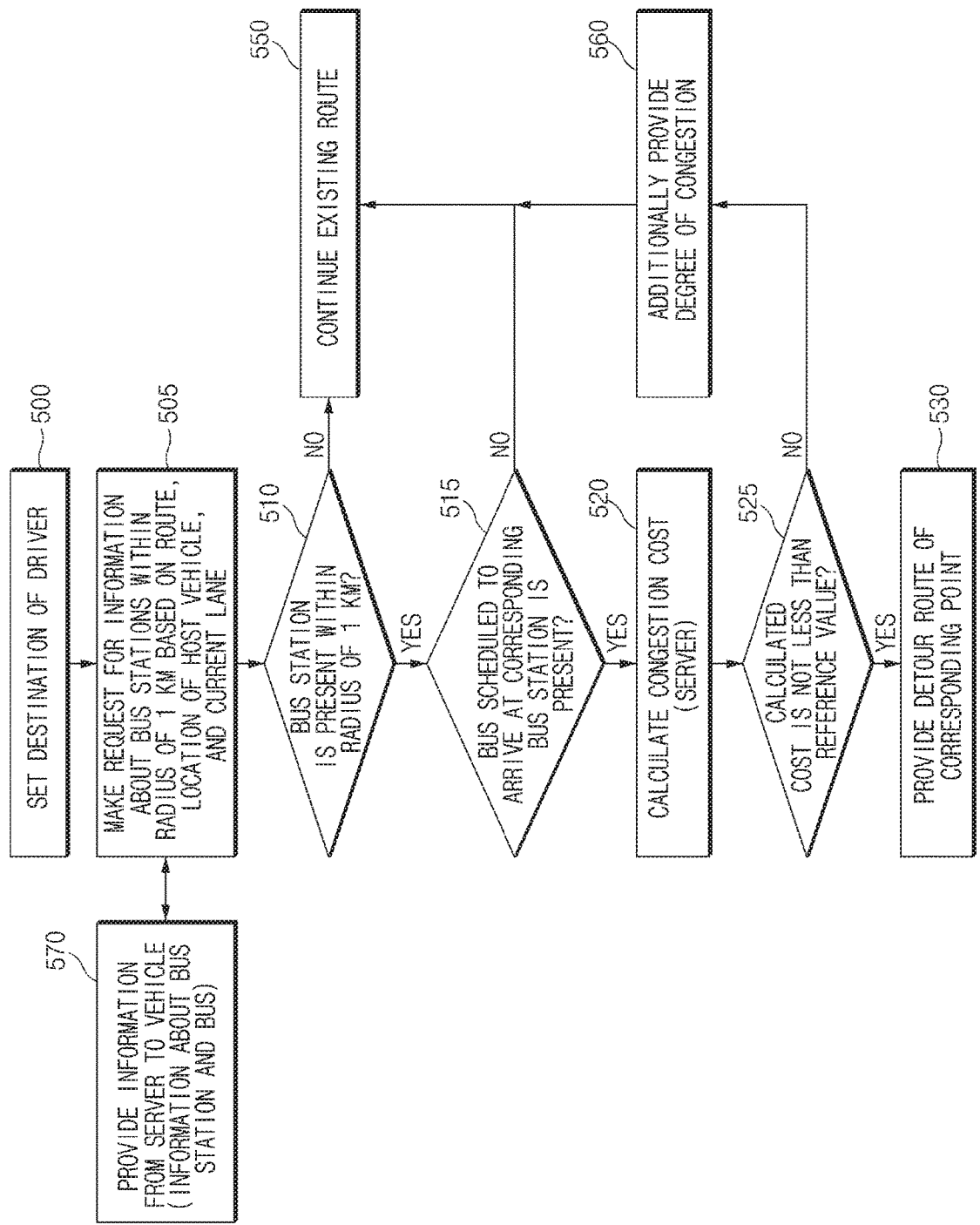
FIG. 5 is a flowchart illustrating a prediction algorithm for routing a vehicle, according to an embodiment of the present disclosure.

FIG. 5 is a signal flowchart for describing a vehicle routing procedure, according to an embodiment of the present disclosure.

Referring to FIG. 5, a driver sets a destination via the vehicle navigation (500). The telematics center makes a request for information about bus stations within the predetermined range based on the driver's route, the location of the host vehicle, and a current lane to the traffic center (505). In the present embodiment, for example, the predetermined range is defined within a radius of 1 km or less. The predetermined range may be used after being changed to another range depending on the service requirements of the vehicle navigation. Furthermore, the telematics center may provide information about the bus station and a bus to the vehicle (570).

The telematics center determines whether a bus station is present within a radius of 1 km (510). When it is determined that a bus station is present (Y), the telematics center determines whether a bus scheduled to arrive at the corresponding bus station is present (515).

The telematics center calculates the degree of congestion in consideration of the number of bus stations, congestion information at each station, the number of buses scheduled to arrive at each station, congestion information of each bus, and information (weight) about the bus route. The telematics center calculates a congestion cost using Equation 1 (520). The server of the telematics center may calculate the congestion cost in consideration of the traffic information and information of the vehicle navigation.

The telematics center identifies the calculated cost and then determines where the calculated cost is present among the predetermined vehicle route ranges (525). That is, when the identified congestion cost is not less than a specified reference value (Y), the telematics center provides the detour route of the corresponding point (530).

Meanwhile, when it is determined, in 510, that the bus station is not present (N), the telematics center continues the existing route (550). Referring to FIG. 4, the telematics center may predict the right-turn at an intersection.

When the identified congestion cost at 525 is present within a range of the specified reference value (N), the telematics center additionally provides the calculated degree of congestion for the corresponding route (560).

Figure 6:
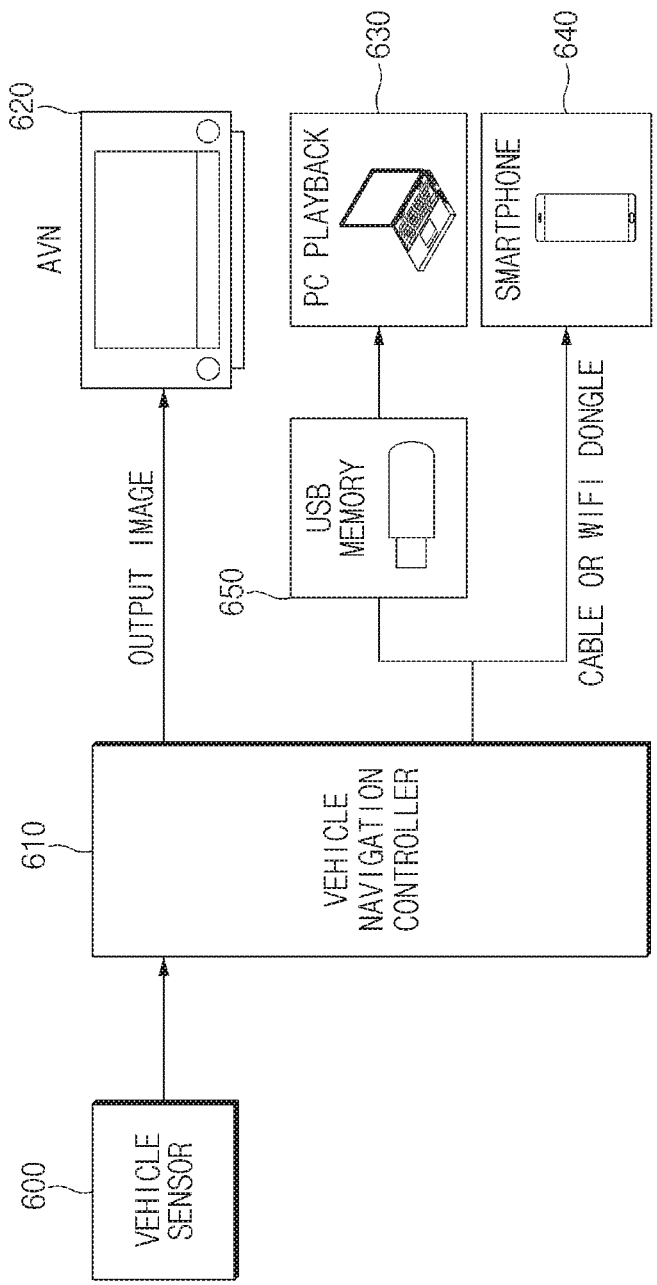
FIG. 6 is a view schematically illustrating a structure of navigation service apparatuses in a vehicle, according to an embodiment of the present disclosure.

FIG. 6 is a view illustrating a concept of a vehicle navigation service using a vehicle navigation controller, according to an embodiment of the present disclosure.

Referring to FIG. 6, a vehicle navigation controller 610 provided in a vehicle may include interworking with a screen 620 of audio video navigation (AVN) in the vehicle and a smartphone 640. The vehicle navigation controller 610 is embedded in the vehicle such as a touch screen, a rotary knob controller, or a touch pad so as to provide a vehicle user with vehicle guide information more efficiently.

The vehicle navigation controller 610 may include advanced functions such as forward and backward high-definition recording, driving recording while a vehicle is driving, a shock detection mode, AVN linkage, smart phone linkage, advanced memory management, and the provision of an embedded multimedia card (eMMC) (built-in memory) through vehicle sensors 60o and may further include a function or the like, which is added for user convenience and security safety.

Moreover, the images stored through a telematics center may include functions such as video playback, video editing, video deletion, and video sharing through an AVN screen or a mobile phone application; the function of recognizing the small-sized number/object may be expanded by enlarging the images through a touch screen. As such, it is possible to share the recorded images or snapshots through smartphone-dedicated applications. It is possible to provide the compressed images or snapshots for adaptive use depending on the lifestyle of a user, by compressing the recorded images or snapshots in a short time. Information may be stored on a USB memory 650 and viewed on PC playback 630.

According to an embodiment of the present disclosure, the vehicle navigation controller 610 may obtain road situations and surrounding vehicle information while the host vehicle is driving, through a vehicle sensor 600, for example, GPS, a gyro sensor, an acceleration sensor, and the like, and may more accurately predict and compensate for the degree of congestion of a road based on the obtained result in addition to information provided from the server.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

This present disclosure provides additional information having high reliability to a driver using a vehicle navigation service. That is, it is possible to provide the driver with additional information about the degree of congestion, and it is possible to automatically change a route as needed.

Accordingly, the driver may recognize the congested right-turn lane along the route in advance, and may avoid the congested right-turn lane as needed. Accordingly, it is possible to provide a vehicle navigation service having user satisfaction and high service reliability.

In addition, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle navigation apparatus, the apparatus comprising:
    a vehicle sensor positioned in a front or a rear of a vehicle, the vehicle sensor configured to recognize surrounding information and road information of the vehicle; and
    a processor configured to:
        identify destination information requested by a user of the vehicle;
        identify location information of the vehicle through the vehicle sensor;

identify the recognized surrounding information and the recognized road information of the vehicle;

identify information about a route according to the identified destination information by controlling the vehicle to identify information about a bus station within a range specified based on the location information of the vehicle and bus information, calculating a degree of congestion of the route, and displaying the calculated degree of congestion through a display device;

provide road congestion and a vehicle waiting route when the calculated degree of congestion belongs to a first range;

provide a lane change and entrance of a right-turn when the calculated degree of congestion belongs to a second range; and provide a detour route when the calculated degree of congestion belongs in to a third range.

2. The apparatus of claim 1, wherein the processor is configured to identify a degree of congestion for the bus station, a degree of congestion of a bus, and weight information about a bus route within the range specified based on the location information of the vehicle to calculate the degree of congestion of the route.

3. The apparatus of claim 1, wherein the processor is configured to set a specific range of a vehicle radius based on the location information of the vehicle to calculate the degree of congestion of the route, wherein the vehicle radius is set to a different value depending on needs of the user or settings of a system for a vehicle navigation service.

4. The apparatus of claim 1, wherein the processor is configured to:

control the vehicle to compare the calculated degree of congestion with a route range predetermined for a vehicle navigation service; and control the vehicle to provide a route corresponding to a corresponding range depending on the compared result.

5. The apparatus of claim 1, wherein the processor is configured to:

control the vehicle to reset a degree of congestion in response to a movement and route information of the vehicle; and control the vehicle to provide an updated route depending on the reset degree of congestion.

6. The apparatus of claim 1, wherein the display device is configured to display a route comment for the degree of congestion via a screen or to provide an alarm through a sound, through the display device of an Audio Video Navigation (AVN) or an alarm device.

7. A vehicle navigation apparatus, the apparatus comprising:

a vehicle sensor positioned in a front or a rear of a vehicle, the vehicle sensor configured to recognize surrounding information and road information of the vehicle; and a processor configured to:

identify destination information requested by a user of the vehicle;

identify location information of the vehicle through the vehicle sensor;

identify the recognized surrounding information and the recognized road information of the vehicle;

identify information about a route according to the identified destination information by controlling the vehicle to identify information about a bus station within a range specified based on the location information of the vehicle and bus information, calculating a degree of congestion of the route, and displaying the calculated degree of congestion through a display device, wherein the processor is configured to calculate a degree of congestion, using an equation $$f(x) = c_0 + \sum_{n=1}^{N} a_n b_n,$$

wherein:
 'N' includes a total number of stations;
 'a' includes a degree of congestion for the bus station;
 'b' includes a degree of congestion of the bus; and
 'c' includes a weighting parameter indicating a route of the bus departing from the bus station immediately before an intersection.

8. The apparatus of claim 7, wherein the degree of congestion for the bus station based on a density of waiting people relative to an area for the bus station.

9. The apparatus of claim 7, wherein the degree of congestion of the bus is classified depending on a number of passengers on the bus, a number of seats in the bus, and a number of handles in the bus, wherein the degree of congestion of the bus is classified as "smooth" when the number of passengers on the bus is less than or equal to the number of seats in the bus, is classified as "normal" when the number of passengers on the bus is greater than the number of seats in the bus but fewer than a sum of the number of seats in the bus and the number of handles in the bus, and is classified as "congested" when the number of passengers in the bus is greater than the sum of the number of seats in the bus and the number of handles in the bus.

10. The apparatus of claim 7, wherein the processor is configured to:

control the vehicle to compare the calculated degree of congestion with a route range predetermined for a vehicle navigation service; and control the vehicle to provide a route corresponding to a corresponding range depending on the compared result.

11. The apparatus of claim 7, wherein the display device is configured to display a route comment for the degree of congestion via a screen or to provide an alarm through a sound, through the display device of an Audio Video Navigation (AVN) or an alarm device.

12. A vehicle navigation method, the method comprising:

recognizing surrounding information and road information of a vehicle;

identifying destination information requested by a user of the vehicle;

identifying location information of the vehicle through a sensor of the vehicle;

identifying the recognized surrounding information and the recognized road information of the vehicle;

controlling the vehicle to identify information about a bus station within a range specified based on the location information of the vehicle and bus information;

calculating a degree of congestion of the route;

displaying the calculated degree of congestion through a display device;

providing road congestion and a vehicle waiting when the calculated degree of congestion belongs to a first range;

providing a lane change and entrance of a right-turn when the calculated degree of congestion belongs to a second range; and providing a detour route when the calculated degree of congestion belongs to a third range.

13. The method of claim 12, wherein controlling the vehicle includes identifying a degree of congestion for the bus station, a degree of congestion of a bus, and weight information about a bus route within the range specified based on the location information of the vehicle to calculate the degree of congestion.

14. The method of claim 13, wherein controlling the vehicle includes setting a specific range of a vehicle radius based on the location information of the vehicle to calculate the degree of congestion, wherein the vehicle radius is set to a different value depending on needs of the user or settings of a system for a vehicle guidance service.

15. The method of claim 12, wherein controlling the vehicle includes calculating the degree of congestion using an equation $$f(x) = c_0 + \sum_{n=1}^{N} a_n b_n,$$

wherein:
- 'N' includes a total number of stations;
- 'a' includes a degree of congestion for the bus station;
- 'b' includes a degree of congestion of a bus; and
- 'c' includes a weighting parameter indicating a route of the bus departing from the bus station immediately before an intersection.

16. The method of claim 15, wherein the degree of congestion for the bus station based on a density of waiting people relative to an area for the bus station.

17. The method of claim 15, wherein the degree of congestion of the bus is classified depending on a number of passengers on the bus, a number of seats in the bus, and a number of handles in the bus, wherein the degree of congestion of the bus is classified as "smooth" when the number of passengers on the bus is less than or equal to the number of seats in the bus, is classified as "normal" when the number of passengers on the bus is greater than the number of seats in the bus but fewer than a sum of the number of seats in the bus and the number of handles in the bus, and is determined as "congested" when the number of passengers in the bus is greater than the sum of the number of seats in the bus and the number of handles in the bus.

18. The method of claim 12, wherein controlling the vehicle includes controlling the vehicle to compare the calculated degree of congestion with a route range predetermined for a vehicle navigation service and to provide a route corresponding to a corresponding range depending on the compared result.

19. The method of claim 12, wherein after controlling the vehicle to provide the route, the method further includes:
- controlling the vehicle to reset a degree of congestion in response to a movement and route information of the vehicle; and
- controlling the vehicle to provide an updated route depending on the reset degree of congestion.

20. The method of claim 12, wherein controlling the vehicle includes controlling the vehicle to display a route comment for the degree of congestion via a screen or to provide an alarm through a sound, through the display device of an Audio Video Navigation (AVN) or an alarm device.

* * * * *